United States Patent
Pryor et al.

(10) Patent No.: US 6,222,899 B1
(45) Date of Patent: Apr. 24, 2001

(54) SYSTEM FOR DETERMINING THE DEPLOYED LENGTH OF A FLEXIBLE TENSION ELEMENT

(75) Inventors: John T. Pryor; William H. Marn; Christopher M. Young, all of San Diego, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/126,298

(22) Filed: Jul. 30, 1998

(51) Int. Cl.$^7$ .......................................................... G01B 7/00
(52) U.S. Cl. .............................. 377/24; 377/16; 385/134; 242/485; 250/559.26
(58) Field of Search ................................. 377/20, 16, 24; 385/12, 134; 33/739, 735; 324/206, 207.13; 114/254; 242/485, 485.1, 485.5; 250/559.26

(56) References Cited

U.S. PATENT DOCUMENTS

| | | |
|---|---|---|
| 3,264,629 | 8/1966 | Bus, Sr. . |
| 3,282,568 | 11/1966 | Shuster . |
| 3,596,070 | 7/1971 | McCool et al. . |
| 3,818,524 | 6/1974 | Starkey . |
| 3,865,305 * | 2/1975 | Sampey ................................. 324/171 |
| 4,338,565 | 7/1982 | Hall . |
| 4,356,557 | 10/1982 | Bell et al. . |
| 4,427,940 | 1/1984 | Hirama et al. . |
| 4,467,280 | 8/1984 | Uehara et al. . |
| 4,570,245 | 2/1986 | Thigpen . |
| 4,581,723 | 4/1986 | Savit . |
| 4,597,183 | 7/1986 | Broding . |
| 4,709,208 | 11/1987 | Kerr . |
| 4,718,168 | 1/1988 | Kerr . |
| 4,818,939 | 4/1989 | Takahashi et al. . |
| 4,852,263 | 8/1989 | Kerr . |
| 4,954,720 * | 9/1990 | Jensen ............................... 250/559.26 |
| 5,025,213 | 6/1991 | Dobler et al. . |
| 5,119,751 | 6/1992 | Wood . |
| 5,315,244 | 5/1994 | Griebeler . |
| 5,381,909 | 1/1995 | Warnan . |
| 5,581,180 | 12/1996 | Ito et al. . |
| 5,620,926 | 4/1997 | Itoh . |

* cited by examiner

Primary Examiner—Cassandra Spyrou
Assistant Examiner—Euncha Cherry
(74) Attorney, Agent, or Firm—Harvey Fendelman; Peter A. Lipovsky; Michael A. Kagan

(57) ABSTRACT

The present invention provides a system for determining the deployed length of a flexible tension element such as cable which is wrapped in a pack and fed through a funnel. The element may be sensed using different types of sensors such as optical, acoustical or magnetic sensors. A sensor is mounted in a funnel flush with the inside funnel surface. As wraps of the flexible tension element are deployed, or pulled off from the pack, individual wraps of the flexible tension element pass across the face of a detector as the flexible tension element is displaced in a generally circular pattern around the inside of the funnel. Signal processing circuitry produces a signal indicating the presence of the flexible tension element within a predetermined distance of the sensor. For example, when a wrap of the flexible tension element is within a predetermined range of the sensor, head a signal representing a first logic level, such as a logic 1, generally in the form of a pulse, is produced; when the flexible tension element is beyond a predetermined range of the sensor head, a signal representing a second logic level, such as a logic zero is produced. A computer counts the pulses and a software program implemented in the computer calculates information about the pack status, such as the deployed length of the flexible tension element. If signal pulses are missing, the software program interpolates between identified pulses to provide a count for the missing, or interpolated pulses. The total count of the missing pulses and detected pulses are correlated to the deployed length of the element.

19 Claims, 6 Drawing Sheets

SYSTEM FOR DETERMINING THE DEPLOYED LENGTH OF A FLEXIBLE TENSION ELEMENT

BACKGROUND OF THE INVENTION

The present invention generally relates to a system for determining the deployed length of a flexible tension element such as cable, and more particularly, to a system which correlates the periodic displacement of a center wrap of a precision wound flexible tension element to a deployed length of the element.

The Navy has many applications which require the deployment of small diameter cables in the ocean. For example, the Navy deploys sensor arrays linked by fiber optic cables for monitoring ocean temperatures, salinity, current strength, and other physical properties. In order to optimize the life of the cable, the cable should conform to the sea floor so that it is not suspended over valleys. To achieve such conformance, it is desirable to know the deployed length of the cable.

In the past, deployed cable length was measured by feeding the cable through an odometer type mechanism that includes two wheels which counter-rotate as the cable is fed between them. An important limitation of the two-wheel type odometer system is that it generally cannot feed cable splices between the wheels. Therefore, the odometer type system is generally not suitable for applications requiring deployed lengths of cable in excess of that available from a single pack where cable from one pack, or spool must be spliced to cable from another pack. Also, this type of counter tends to be inaccurate and is cable specific. Another type of system for measuring deployed cable length relies on markers positioned at regular intervals along the cable. Such markers may include bar codes, magnetic spots, or metallic bands. A significant disadvantage of this type of system is that it requires additional manufacturing steps with associated costs to affix the markers along the cable.

A need therefore exists for a method for measuring the deployed length of a cable that can accommodate cable splices, is highly accurate, can be used on a wide range of cable diameters and designs, and which does not require markers. A non-contact method for determining the deployed length of a cable would be preferred.

SUMMARY OF THE INVENTION

The present invention provides a system for determining the deployed length of a flexible tension element such as cable which is wrapped in a pack. The present invention provides a system for determining the deployed length of a flexible tension element such as cable which is wrapped in a pack and fed through a funnel. The element may be sensed using different types of sensors such as optical, acoustical or magnetic sensors. A sensor is mounted in a funnel flush with the inside funnel surface. As wraps of the flexible tension element are deployed, or pulled off from the pack, individual wraps of the flexible tension element pass across the face of a detector as the flexible tension element is displaced in a generally circular pattern around the inside of the funnel. Signal processing circuitry produces a signal indicating the presence of the flexible tension element within a predetermined distance of the sensor. For example, when a wrap of the flexible tension element is within a predetermined distance of the sensor, a signal representing a first logic level, having a logic 1 value generally in the form of a pulse is produced; when the flexible tension element is beyond a predetermined range of the sensor head, a signal representing a second logic level such as a logic zero is produced. A computer counts the number of pulses and employs a software program to determine information about the pack, such as the deployed length of the flexible tension element.

An important advantage of the invention is that by accounting for missing pulses, the system provides more accurate values for the deployed length of the element by minimizing accumulation error due to missing pulses.

Another advantage of the invention is that it provides a non-contact system for determining the deployed length of a cable. Therefore, the system may be used to determine the deployed lengths of cables which are spliced together.

These and other advantages of the invention will become more apparent upon review of the accompanying drawings and specification, including the claims.

BRIEF DESCRIPTION OF THE DRAWINGS

Throughout the several view, like elements are referenced using like references.

DESCRIPTION OF THE PREFERRED EMBODIMENT

Figure 1:
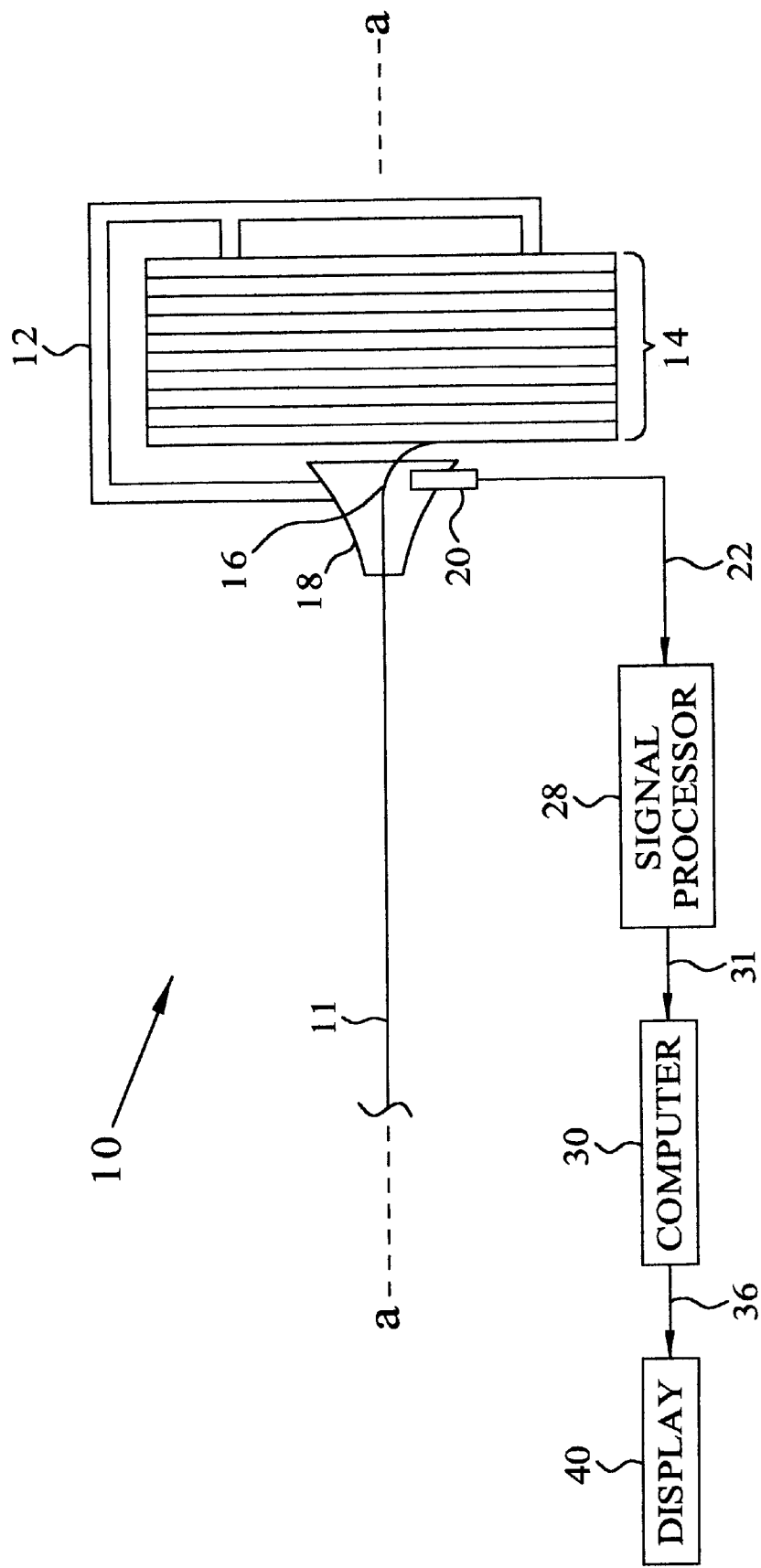
FIG. 1 illustrates a system for determining the deployed length of a flexible tension element embodying various features of the present invention.
Figure 2:
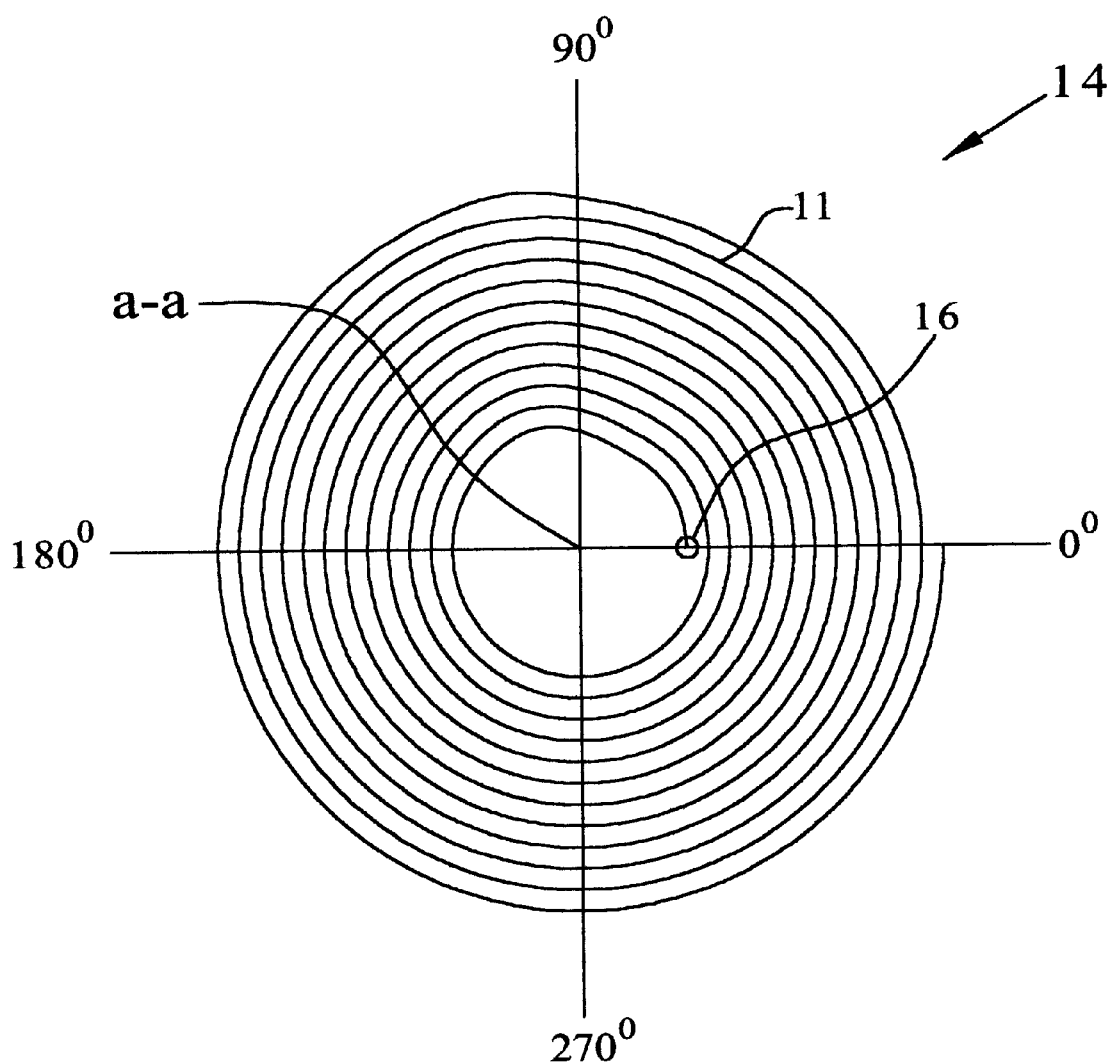
FIG. 2 illustrates the deployed section of the flexible tension element at 0° with respect to deployment axis a—a.
Figure 3:
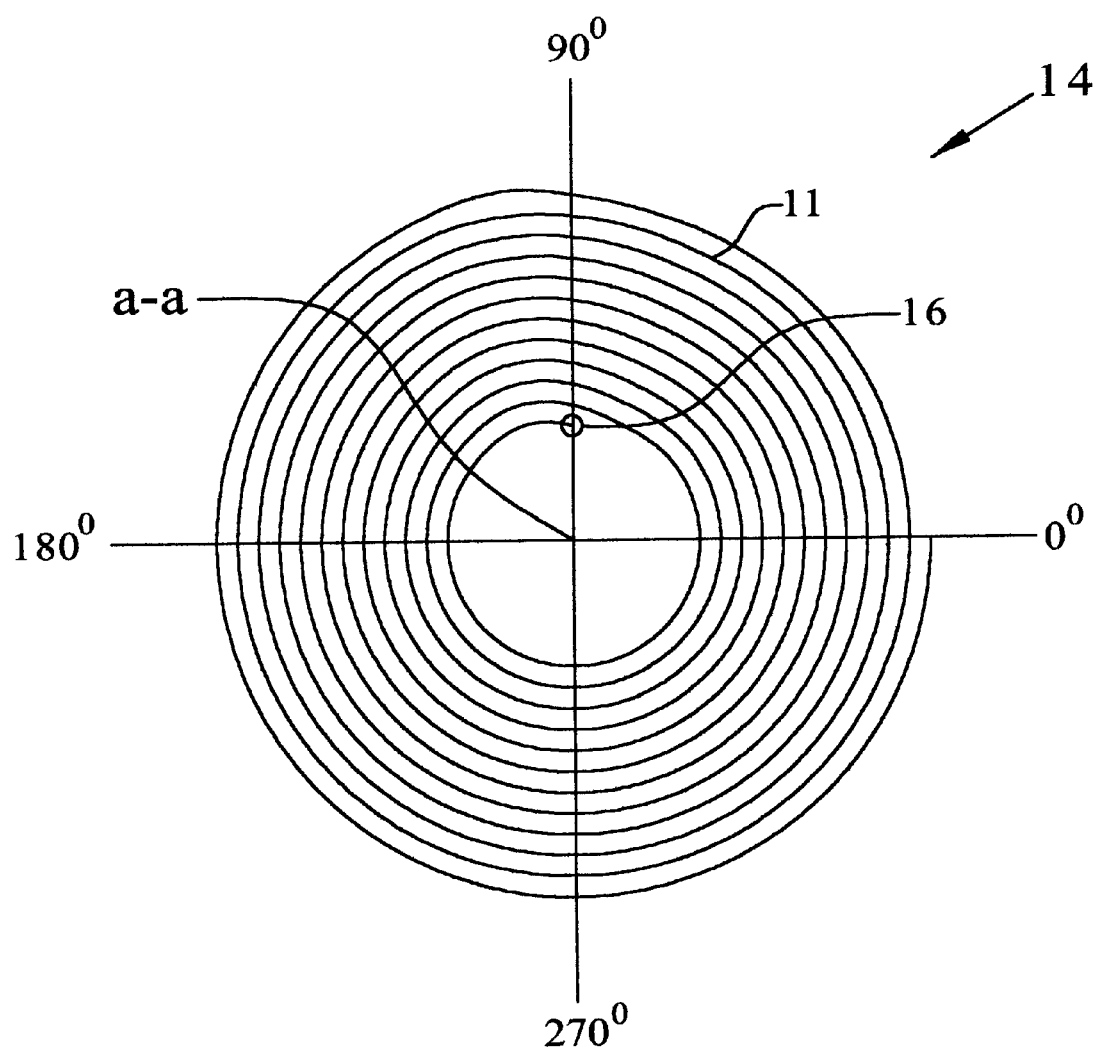
FIG. 3 illustrates the deployed section of the flexible tension element at 90° with respect to deployment axis a—a.
Figure 4:
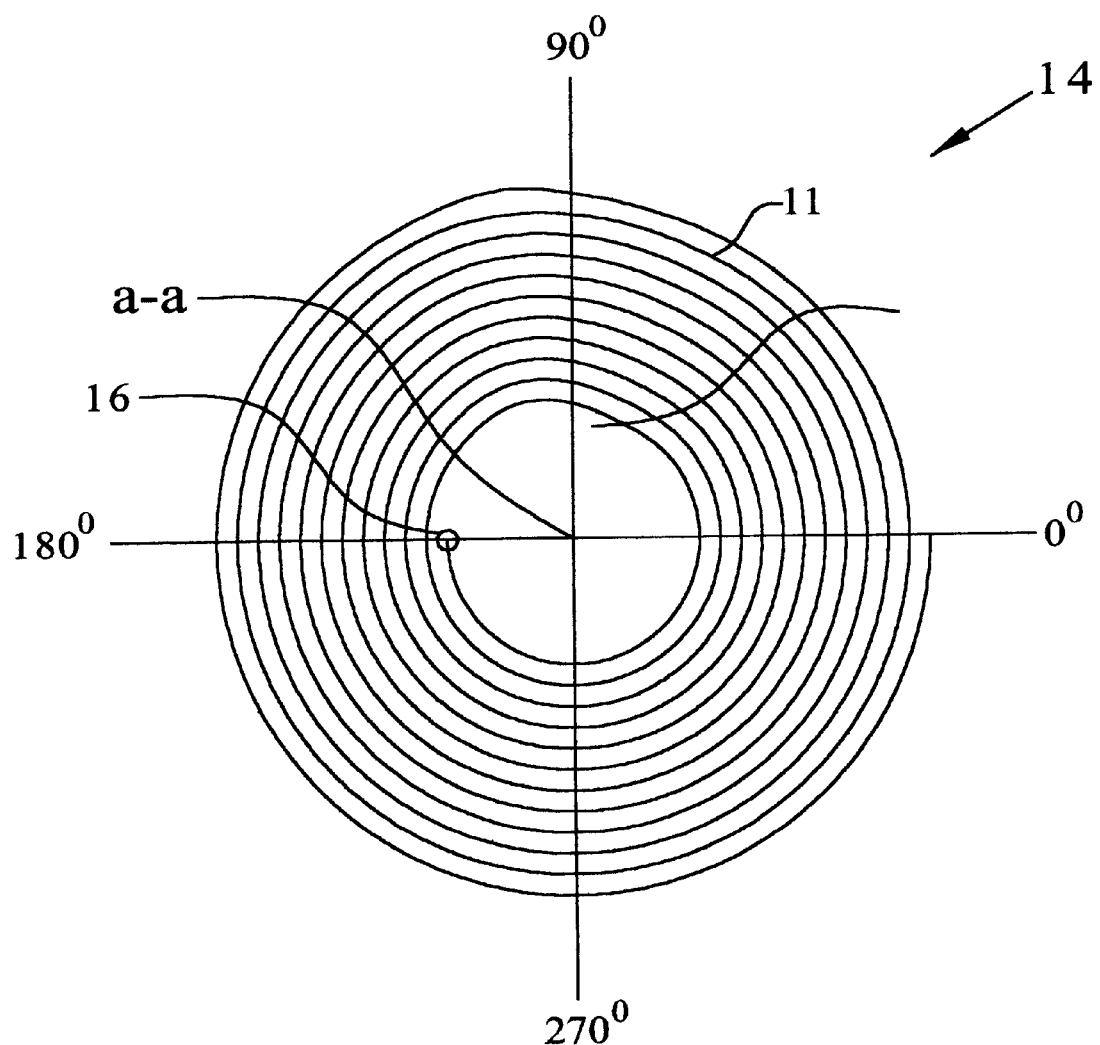
FIG. 4 illustrates the deployed section of the flexible tension element at 180° with respect to deployment axis a—a.

With reference to FIG. 1, the present invention is directed to a system 10 for determining the deployed length of flexible tension element 11. System 10 includes a frame 12 for supporting a wound pack 14 of a flexible tension element 11, which may be implemented as wire rope, nylon, optical fiber, or any other flexible tension element which may be wrapped in a pack. Examples of flexible tension element 11 suitable for use in conjunction with the present invention may include fiber optic microcables of the type described in U.S. Pat. Nos. 5,636,307, 5,440,660, and 5,259,055, all incorporated herein by reference. A funnel 18 is mounted to frame 12 through which flexible tension element 11 is guided along axis a—a. A sensor 20, mounted to funnel 18, generates an analog voltage signal 22 representing the presence of the element 11 when a section 16 of flexible tension element 11 whips around into a position within a predetermined distance of the sensor. System 10 takes advantage of the fact that as flexible tension element 11 unwinds from pack 14, section 16 whips around in a generally circular pattern as it feeds through funnel 18. For example, as flexible tension element 11 pays out, section 16 is shown positioned successively in FIGS. 2, 3, and 4 at 0°, 90°, and 180° angular displacement, respectively, with respect to reference axis a—a.

Signal processor 28 transforms analog voltage signal 22 into pulse signal 31 having a predetermined logic level that represents the proximity of section 16 within a predetermined distance of sensor 20. Data processor, or computer 30 counts each pulse signal 31 and correlates the pulse count with a deployed length of flexible tension element 11 using pack parameters specific to the particular configuration of pack 14, where such parameters generally are provided by the pack vendor. Computer 30 generates an output signal 36 representing information such as the deployed, or unwound length of flexible tension element 11 that is provided to display 40. Signal 36 may also include additional information such as the acceleration and/or velocity of flexible tension element 16. Correlation of the pulse count with a deployed length of flexible tension element 16 by data processor 30 may be accomplished using a suitable algorithm or by a look-up table implemented in computer 30. By way of example, sensor 20 was implemented as a Kaman Model 851166, and signal processor 28 was implemented as a Kaman Signal Conditioning Module, Model KD2400. Types of sensors suitable for use in conjunction with the present invention include acoustic, magnetic, proximity, and optical sensors.

Display 40 transforms signal 36 into human readable output that may include, for example, information such as the deployed length, undeployed length, and total length of flexible element 11, as well as the velocity and/or acceleration of flexible tension element 11. Display 40 may be implemented as a printer, video monitor, strip chart, or any other type of output device capable of transforming an input signal into a human readable signal.

Figure 5:
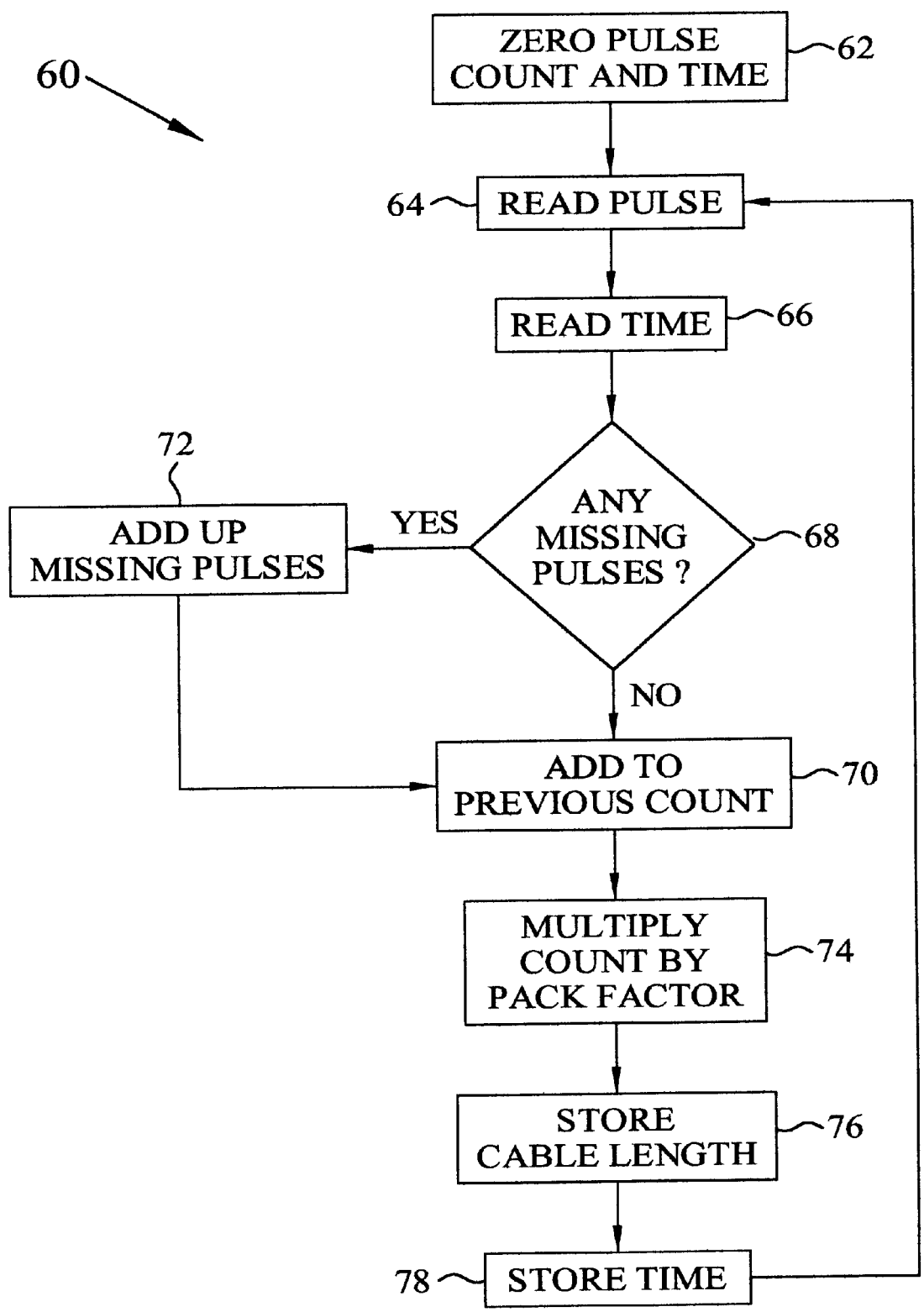
FIG. 5 illustrates flow chart 60 implemented in computer 30 of FIG. 1.

The operation of computer 30 is described with reference to software routine 60 depicted, by way of example, in FIG. 5. At step 62, values for the pulse count and time are initialized to each be zero. The pulses and time are read at steps 64 and 66, respectively. Step 68 determines if there are any missing pulses.

Figure 6:
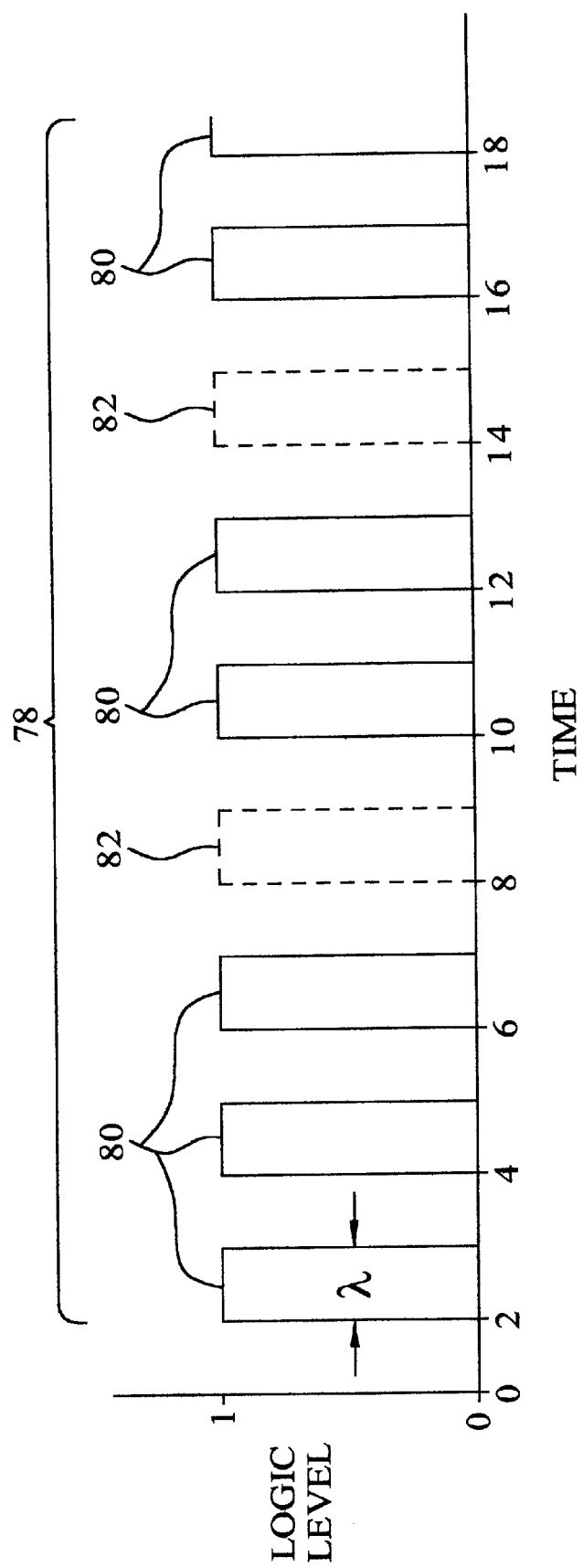
FIG. 6 illustrates an example of a train of pulses comprising signal 31 of FIG. 1 over time.

In FIG. 6, there is shown a train 78 of signal pulses 80 comprising signal 31 over time. The signal pulses 80 each have a pulse width X and a pulse period, by way of example, of 2 time units. The pulses 80 each represent a detection by sensor 20 of flexible tension element 16 within a predetermined distance of the sensor. However, there may arise circumstances wherein as flexible tension element 11 pays out, the element 11 may not be detected if, for example, element 11 does not whip around sufficiently within funnel 18, resulting in missing pulses, represented by phantom pulses 82. The pay out rate of flexible tension element 11 is a second order system that cannot change instantaneously. Therefore, very accurate determination of the deployed length of element 11 may be obtained by substituting a count for each missing pulse, i.e., an interpolated pulse 82, to minimize error accumulation in the determination of the deployed length of flexible tension element 11. The time for each interpolated pulse 82 may be determined from the time assigned to selected pulses 80 within a predetermined time of the missing pulses using well known numerical techniques. Substituting a count for each interpolated pulse 82 is important because the number of pulse counts may be mapped through either an algorithm or look-up table implemented in computer 30 into a value for the deployed length of flexible tension element 11. Moreover, by determining the time between pulses, computer 30 may also determine the pay out velocity of element 11. Also, by determining the change in time between successive pulses, computer 30 may determine the acceleration, both positive and negative, of element Referring again to FIG. 5, if there is no missing pulse detected at step 68 (NO), program 60 continues to step 70 which adds the last detected pulse to the accumulated pulse count. If the determination at step 68 is that a pulse is missing (YES), program 60 proceeds to step 72 which adds the interpolated (missing) pulses 82. Program 60 continues from step 72 to step 70 which adds the interpolated pulses 82 to the accumulated pulse count. Next, at step 74, the pulse count is used to determine the deployed length, $L_{Dep}$ of the flexible tension element 11. The value of $L_{Dep}$ is stored at step 76, and then the value for time, provided by an internal clock in computer 30, is stored at step 78.

Obviously, many modifications and variations of the present invention are possible in light of the above teachings. It is therefore to be understood that within the scope of the appended claims, the invention may be practiced otherwise than as specifically described.

What is claimed is:

1. A system for determining the deployed length of a flexible tension element, comprising:
    a frame for supporting a flexible tension element wound in a pack;
    a funnel mounted to said frame and having a center axis;
    a sensor mounted to said funnel for generating a first signal whenever a section of said flexible tension element whips around said center axis within a predetermined distance of said sensor as said flexible tension element feeds through said funnel;
    a signal processor for generating a pulse in response to receiving said first signal; and
    a data processor for determining a pulse count by counting each said pulse and determining the deployed length of said flexible tension element from said pulse count.

2. The system of claim 1 wherein said data processor generates a second signal representing said deployed length, and said system further includes a display device for generating a human readable output signal representing said deployed length.

3. The system of claim 1 wherein said sensor is selected from the group that includes acoustic sensors and optical sensors.

4. The system of claim 1 wherein said flexible tension element includes a magnetic material.

5. The system of claim 4 wherein said sensor is a magnetic sensor.

6. The system of claim 1 wherein said flexible tension element is a cable.

7. The system of claim 1 wherein said flexible tension element includes an optical fiber.

8. The system of claim 1 wherein said data processor determines a velocity of said flexible tension element.

9. The system of claim 1 wherein said data processor determines an acceleration of said flexible tension element.

10. The system of claim 1 wherein said sensor is a proximity sensor.

11. A system for determining the deployed length of a flexible tension element, comprising:
    a frame for supporting a flexible tension element wound in a pack;
    a funnel mounted to said frame and having a center axis;
    a sensor mounted to said funnel for generating a first signal where a section of said flexible tension element whips around said center axis within a predetermined distance of said sensor as said flexible tension element feeds through said funnel;
    a signal processor for generating a pulse train comprising a series of pulses, where each of said pulses is generated in response to said signal processor receiving said first signal; and a data processor for determining if said pulse train has missing pulses based on a periodicity of said pulse train, counting said missing pulses, and for determining a deployed length of said flexible tension element from each said of said pulses and said missing pulses.

12. The system of claim 11 wherein said data processor generates a second signal representing said deployed length, and said system further includes a display device for generating a human readable output signal representing said deployed length of said flexible tension element.

13. A system for determining the deployed length of a flexible tension element, comprising:

a frame for supporting a flexible tension element wound in a pack;

a funnel mounted to said frame and having a center axis;

a sensor mounted to said funnel for generating a first signal each time said sensor detects a section of said flexible tension element whipping around said center axis within a predetermined distance of said sensor as said flexible tension element feeds through said funnel;

a signal processor for generating a pulse in response to receiving said first signal; and a data processor for determining a pulse count by counting each said pulse and determining the deployed length of said flexible tension element from said pulse count.

14. The system of claim 13 wherein said data processor generates a second signal representing said deployed length, and said system further includes a display device for generating a human readable output signal representing said deployed length.

15. The system of claim 13 wherein said sensor is selected from the group that includes acoustic sensors and optical sensors.

16. The system of claim 13 wherein said flexible tension element includes a magnetic material.

17. The system of claim 16 wherein said sensor is a magnetic sensor.

18. The system of claim 13 wherein said flexible tension element is a cable.

19. The system of claim 13 wherein said flexible tension element includes an optical fiber.

* * * * *